(12) United States Patent
Sakhnini et al.

(10) Patent No.: US 11,627,568 B2
(45) Date of Patent: Apr. 11, 2023

(54) CONTROL RESOURCE SET FOR REDUCED-CAPABILITY USER EQUIPMENT

(71) Applicant: QUALCOMM Incorporated, San Diego, CA (US)

(72) Inventors: Iyab Issam Sakhnini, San Diego, CA (US); Wooseok Nam, San Diego, CA (US); Tao Luo, San Diego, CA (US); Juan Montojo, San Diego, CA (US); Peter Gaal, San Diego, CA (US); Peter Pui Lok Ang, San Diego, CA (US); Huilin Xu, San Diego, CA (US); Jelena Damnjanovic, Del Mar, CA (US); Olufunmilola Omolade Awoniyi-Oteri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 98 days.

(21) Appl. No.: 17/248,442

(22) Filed: Jan. 25, 2021

(65) Prior Publication Data

US 2021/0250930 A1 Aug. 12, 2021

Related U.S. Application Data

(60) Provisional application No. 62/972,895, filed on Feb. 11, 2020.

(51) Int. Cl.
*H04W 72/04* (2009.01)
(52) U.S. Cl.
CPC ....... *H04W 72/042* (2013.01); *H04W 72/048* (2013.01)

(58) Field of Classification Search
CPC ............. H04W 72/042; H04W 72/048; H04W 72/0446; H04W 48/02; H04W 76/27; H04W 72/0406
See application file for complete search history.

(56) References Cited

U.S. PATENT DOCUMENTS

| | | | |
|---|---|---|---|
| 2013/0155996 A1* | 6/2013 | Horiuchi | H04W 72/0406 370/329 |
| 2015/0264665 A1* | 9/2015 | Vos | H04L 5/00 370/329 |
| 2016/0360551 A1* | 12/2016 | Bergman | H04W 4/70 |
| 2018/0014281 A1* | 1/2018 | Takeda | H04W 72/042 |
| 2020/0396744 A1* | 12/2020 | Xiong | H04W 72/0446 |
| 2021/0092718 A1* | 3/2021 | Chen | H04L 5/0053 |
| 2021/0160879 A1* | 5/2021 | Lin | H04L 1/1854 |
| 2021/0227451 A1* | 7/2021 | Babaei | H04W 48/02 |
| 2021/0235339 A1* | 7/2021 | Babaei | H04W 76/27 |
| 2021/0351837 A1* | 11/2021 | Nader | H04B 7/0693 |
| 2022/0046721 A1* | 2/2022 | Yan | H04W 52/0216 |

* cited by examiner

*Primary Examiner* — Chi Ho A Lee
*Assistant Examiner* — Andrew Lee
(74) *Attorney, Agent, or Firm* — Harrity & Harrity, LLP

(57) ABSTRACT

Various aspects of the present disclosure generally relate to wireless communication. In some aspects, a user equipment (UE) may receive, based at least in part on the UE being a reduced-capability UE, control information on a reduced capability control resource set (CORESET) at least partially in a reduced capability region of a CORESET region, wherein the reduced capability CORESET is associated with a reduced configuration relative to a CORESET for a non-reduced-capability UE; and communicate in accordance with the control information. Numerous other aspects are provided.

30 Claims, 7 Drawing Sheets

CONTROL RESOURCE SET FOR REDUCED-CAPABILITY USER EQUIPMENT

CROSS-REFERENCE TO RELATED APPLICATION

This patent application claims priority to U.S. Provisional Patent Application No. 62/972,895, filed on Feb. 11, 2020, entitled "CONTROL RESOURCE SET FOR REDUCED-CAPABILITY USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a control resource set (CORESET) for a reduced-capability user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, based at least in part on the UE being a reduced-capability UE, control information on a reduced capability control resource set (CORESET) at least partially in a reduced capability region of a CORESET region, wherein the reduced capability CORESET is associated with a reduced configuration relative to a CORESET for a non-reduced-capability UE; and communicating in accordance with the control information.

In some aspects, a method of wireless communication, performed by a base station, may include transmitting, to a UE based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and communicating with the UE in accordance with the control information.

In some aspects, a UE for wireless communication may include a memory and one or more processors operatively coupled to the memory. The memory and the one or more processors may be configured to receive, based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and communicate in accordance with the control information.

In some aspects, a base station for wireless communication may include a memory and one or more processors operatively coupled to the memory. The memory and the one or more processors may be configured to transmit, to a UE based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and communicate with the UE in accordance with the control information.

In some aspects, a non-transitory computer-readable medium may store one or more instructions for wireless communication. The one or more instructions, when executed by one or more processors of a UE, may cause the one or more processors to receive, based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and communicate in accordance with the control information.

In some aspects, a non-transitory computer-readable medium may store one or more instructions for wireless communication. The one or more instructions, when executed by one or more processors of a base station, may cause the one or more processors to transmit, to a UE based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and communicate with the UE in accordance with the control information.

In some aspects, an apparatus for wireless communication may include means for receiving, based at least in part on the apparatus being a reduced-capability apparatus, control information on a reduced capability CORESET at least partially in a reduced capability region of a CORESET region, wherein the reduced capability CORESET is associated with a reduced configuration relative to a CORESET for a non-reduced-capability apparatus; and means for communicating in accordance with the control information.

In some aspects, an apparatus for wireless communication may include means for transmitting, to a UE based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE; and means for communicating with the UE in accordance with the control information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
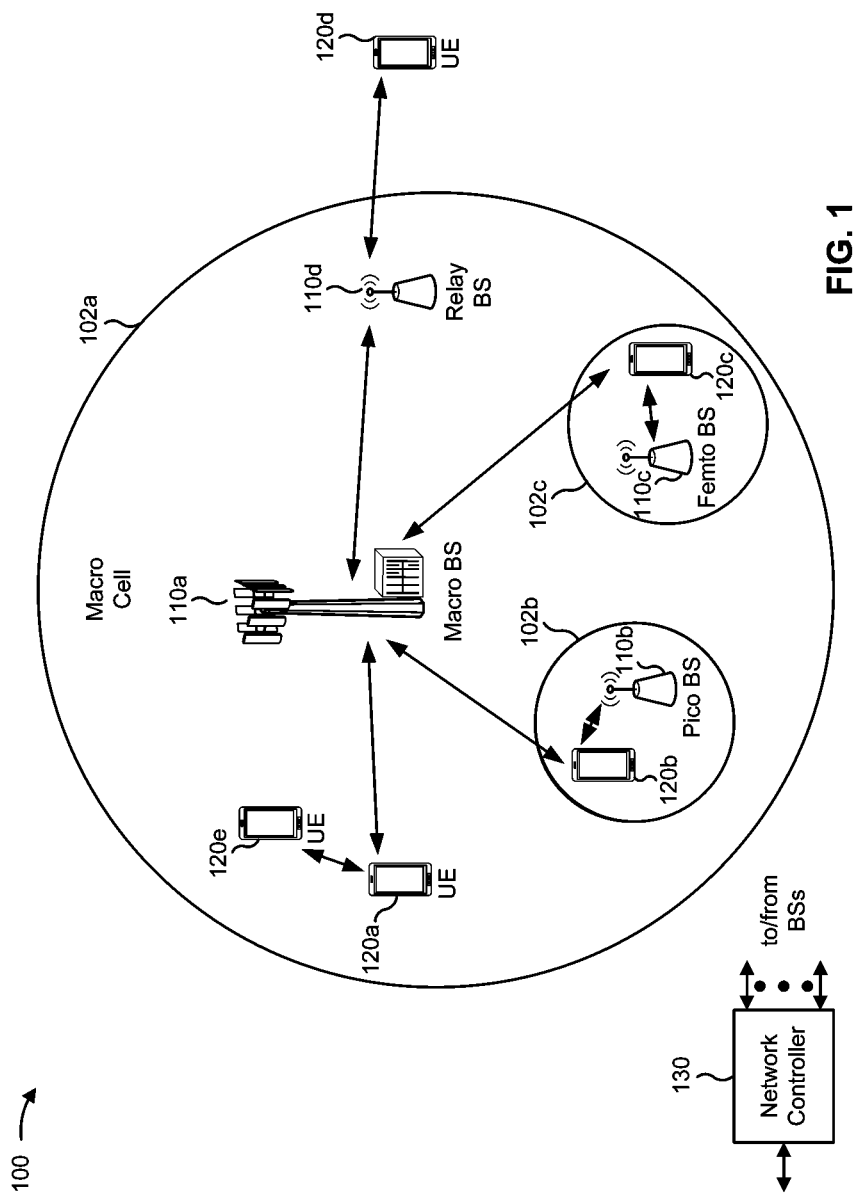
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
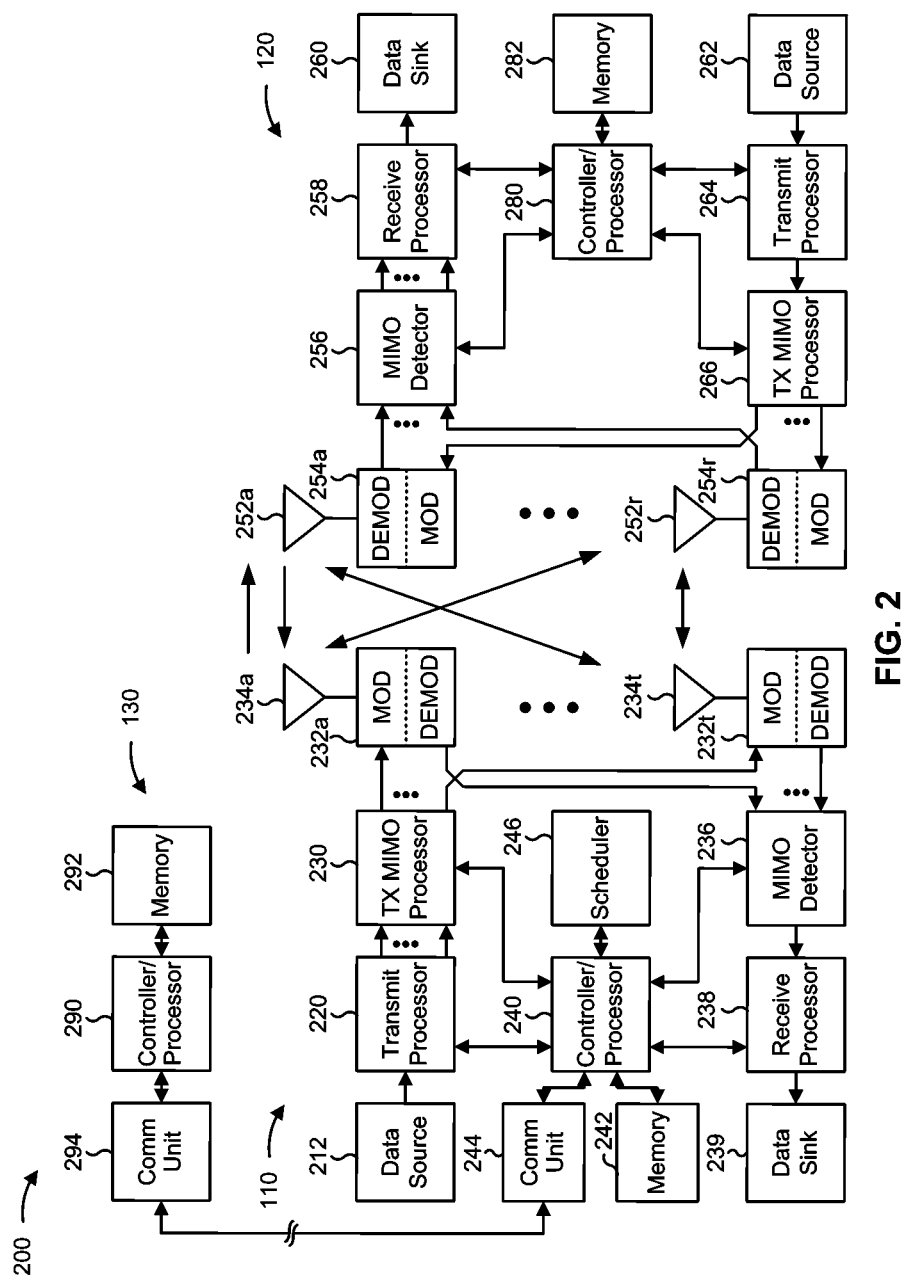
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with a reduced capability control resource set (CORESET), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, based at least in part on the UE being a reduced-capability UE, control information on a reduced capability CORESET at least partially in a reduced capability region of a CORESET region; means for communicating in accordance with the control information; means for receiving information indicating a first set of control channel candidates associated with the reduced capability CORESET and a second set of control channel candidates associated with the CORESET for the non-reduced-capability UE; means for receiving information and using the information to map a non-reduced-capability configuration associated with the CORESET for the non-reduced-capability UE to a reduced capability configuration associated with the reduced capability CORESET; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE based at least in part on the UE being a reduced-capability UE, control information on a reduced capability CORESET at least partially in a reduced capability region of a CORESET region; means for communicating with the UE in accordance with the control information; means for transmitting information indicating a first set of control channel candidates associated with the reduced capability CORESET and a second set of control channel candidates associated with the CORESET for the non-reduced-capability UE; means for transmitting information used to map a non-reduced-capability configuration associated with the CORESET for the non-reduced-capability UE to a reduced capability configuration associated with the reduced capability CORESET; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may receive control information on a physical downlink control channel (PDCCH). For example, the UE may scan for the control information using a radio network temporary identifier (RNTI) associated with the UE. The PDCCH may be on a PDCCH candidate. A set of PDCCH candidates may be included in a CORESET region which may be an allocation of time/frequency resources that a UE is configured to scan for control information. The resource usage associated with scanning the CORESET may be approximately proportionate to a bandwidth of the CORESET and a number of PDCCH candidates associated with the UE. For example, a wider CORESET (associated with a larger bandwidth range) may take more time or resources to scan, and a larger number of PDCCH candidates may take more time or resources to scan.

Some UEs may be reduced-capability UEs. As used herein, a reduced-capability UE refers to an NR UE that is associated with a reduced number of transmit or received antennas, a reduced operating bandwidth, a half-duplex frequency division duplexing (FDD) configuration, a relaxed processing time and/or capability, a combination thereof, and/or the like, relative to an eMBB NR UE. In some aspects, a reduced-capability UE may be associated with a lower capability than an eMBB UE and a higher capability than an IoT/MTC device. For example, a reduced-capability UE may include a wearable UE, a device requiring a higher throughput than an IoT/MTC device, and/or the like. In some aspects, a reduced-capability UE may operate in a particular frequency range, such as FR1 or FR2.

A standard CORESET (e.g., a CORESET associated with an eMBB UE) may strain the processing and bandwidth capabilities of a reduced-capability UE. Furthermore, a reduced-capability UE may have a different system information block 1 (SIB1) than an eMBB UE. Thus, a reduced-capability UE may use a different CORESET (referred to herein as a reduced capability CORESET) than an eMBB UE. However, if a CORESET region associated with the reduced capability CORESET is provided separately from a CORESET region associated with a non-reduced-capability UE, then significant communication resources may be used and efficiency of the air interface may be reduced.

Some techniques and apparatuses described herein provide multiplexing or overlapping of a reduced capability CORESET region (e.g., one or more CORESETs in which control information for a reduced-capability UE may be received) with a non-reduced-capability CORESET region (e.g., one or more CORESETs in which control information for a non-reduced-capability UE may be received). In some aspects, the reduced capability CORESET region may be a sub-region of the non-reduced-capability CORESET region. As used herein, a sub-region of a CORESET region may refer to a region that at least partially overlaps the CORESET region. For example, the sub-region may be entirely included in the CORESET region, or may be partially non-overlapped with the CORESET region. In some aspects, control information for the reduced-capability UE can be scrambled using a RNTI associated with reduced-capability UEs, meaning that a non-reduced-capability UE can scan the entire CORESET region without erroneously receiving reduced capability control information, which simplifies implementation of the non-reduced-capability UE and ensures backward compatibility with non-reduced-capability UEs. In this way, reduced capability CORESETs may be multiplexed with non-reduced-capability CORESETs, which improves resource utilization. Furthermore, resource consumption of the reduced-capability UE may be reduced, and the reduced-capability UE can use a reduced capability SIB1 transmitted on a reduced capability CORESET, thereby facilitating the reduced operating bandwidth of the reduced-capability UE.

Figure 3:
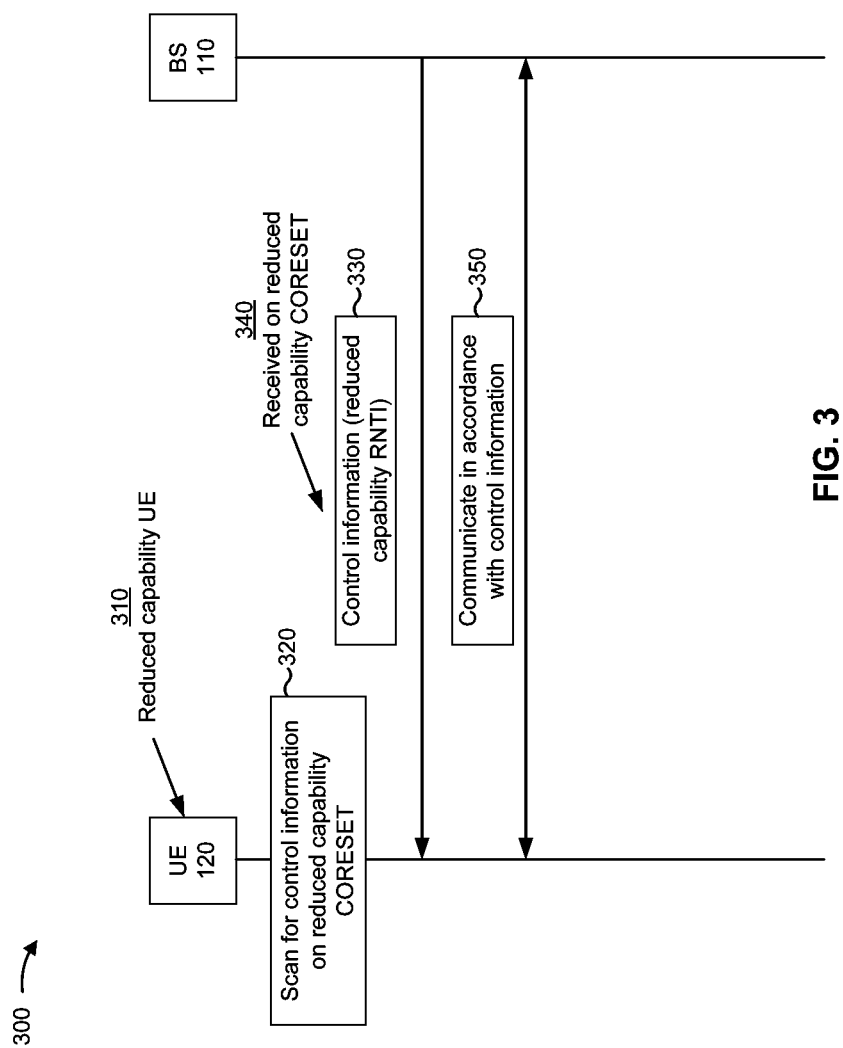
FIG. 3 is a diagram illustrating an example of signaling associated with a reduced capability CORESET, in accordance with various aspects of the present disclosure.

FIG. 3 is a diagram illustrating an example 300 of signaling associated with a reduced capability CORESET, in accordance with various aspects of the present disclosure. As shown in FIG. 3, example 300 includes a UE 120 and a BS 110. As shown by reference number 310, the UE 120 may be a reduced-capability UE. For example, the UE 120 may signal, to the BS 110, information (e.g., capability information) indicating that the UE 120 is a reduced-capability UE. As another example, the BS 110 may determine that the UE 120 is a reduced-capability UE based at least in part on device information associated with the UE 120, a communication behavior of the UE 120, and/or the like.

As shown by reference number 320, the UE 120 may scan for control information on a reduced capability CORESET. For example, the reduced capability CORESET may be associated with a reduced capability CORESET region that is at least partially included in a CORESET region for a non-reduced-capability UE. For a more detailed description of the CORESET regions, refer to FIGS. 4 and 5. In some aspects, the UE 120 may scan for the control information based at least in part on a configuration received from the BS 110. For example, the BS 110 may signal information explicitly identifying the reduced capability CORESET region. As another example, for CORESET0, the BS 110 may use a mapping between a non-reduced-capability configuration for CORESET0 (e.g., signaled by controlResourceSetZero and searchSpaceZero) and one or more reduced capability configurations of the UE 120 and/or the CORESET0. In some aspects, the UE 120 may scan for the control information based at least in part on a PDCCH candidate to CCE hashing function, which is described in more detail in connection with FIG. 5.

As shown by reference number 330, the UE 120 may receive control information. As shown by reference number 340, the UE 120 may receive the control information on the reduced capability CORESET. As further shown, the control information may be scrambled using a reduced capability RNTI. By the UE 120 scrambling the control information using a reduced capability RNTI, the likelihood of a non-reduced-capability UE receiving unintended control information is reduced.

As shown by reference number 350, the UE 120 and the BS 110 may communicate in accordance with the control information. For example, the UE 120 may perform a transmission on a grant identified by the control information, may activate a configured grant associated with the control information, may receive a transmission on a resource identified by the control information, may activate or deactivate a bandwidth part, and/or the like. Thus, the reduced-capability UE may receive control information on a reduced capability CORESET, which may involve a narrower bandwidth and/or a different resource allocation than a non-reduced-capability CORESET, thereby conserving communication and computing resources of the UE 120.

As indicated above, FIG. 3 is provided as an example. Other examples may differ from what is described with respect to FIG. 3.

Figure 4:
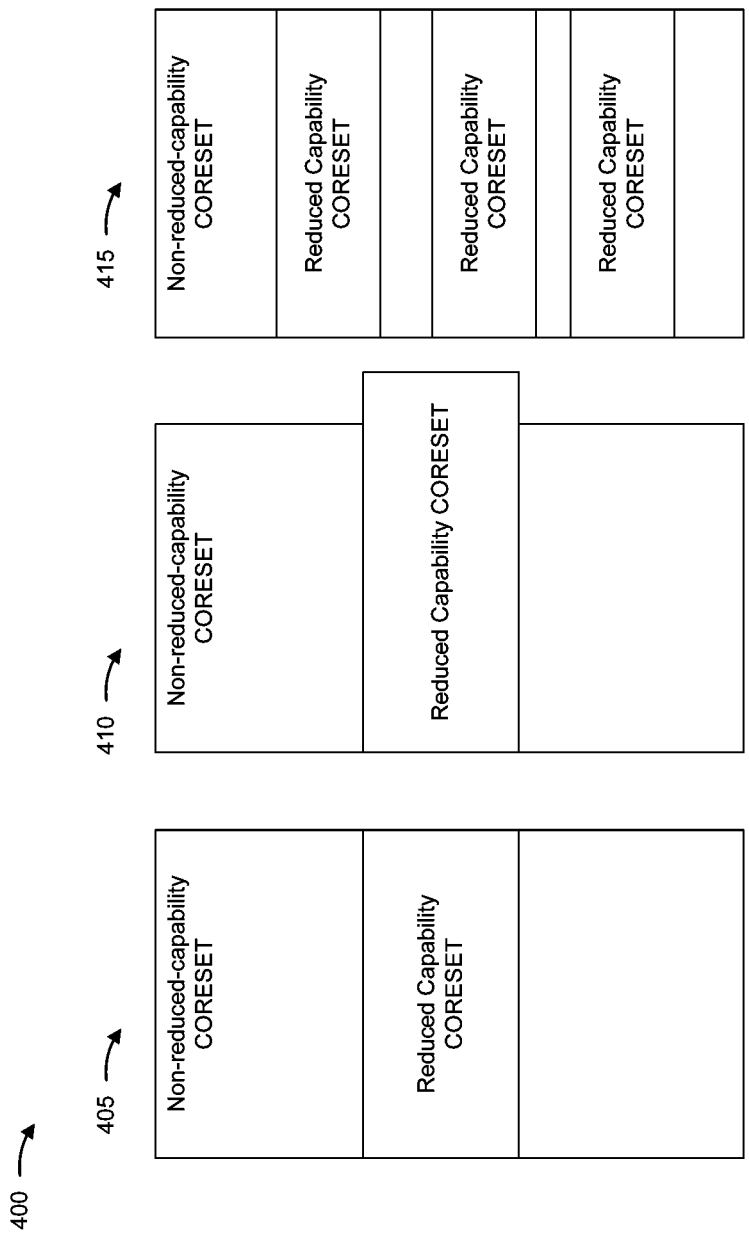
FIGS. 4 and 5 are diagrams illustrating examples of reduced capability CORESET regions relative to non-reduced-capability CORESET regions, in accordance with various aspects of the present disclosure.
Figure 5:
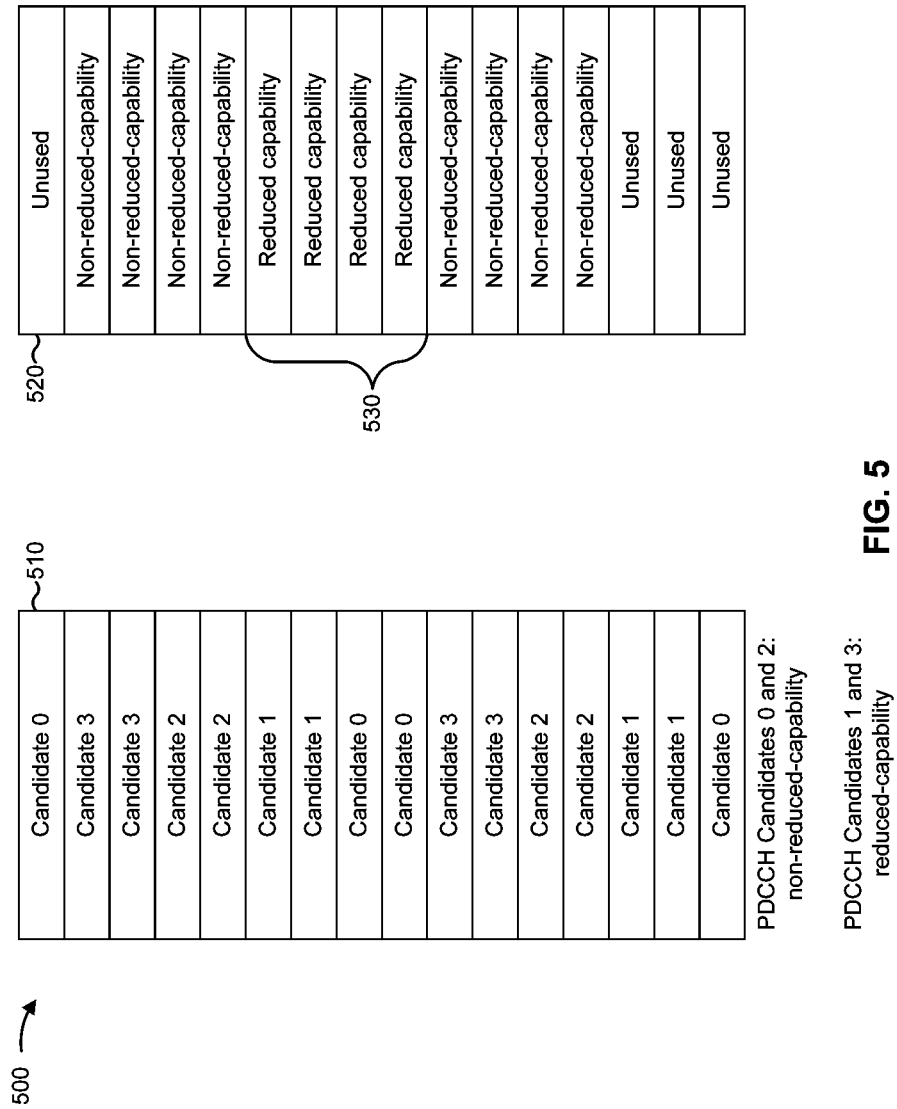

FIGS. 4 and 5 are diagrams illustrating examples 400 and 500 of reduced capability CORESET regions relative to non-reduced-capability CORESET regions, in accordance with various aspects of the present disclosure. In FIGS. 4 and 5, the horizontal direction generally represents time and the vertical direction generally represents bandwidth.

The reduced capability CORESET may be differentiated from the non-reduced-capability CORESET in at least one of frequency, time, and/or control channel elements (e.g., PDCCH candidates). For example, the reduced capability CORESET may have a narrower bandwidth and a same number of symbols (as shown by reference number 405), or may have a narrower bandwidth and more symbols (as shown by reference number 410). In some aspects, the reduced capability CORESET may have a different bandwidth, a different number of symbols, a different aggregation level, and/or a different number of PDCCH candidates than the non-reduced-capability CORESET. As shown in FIG. 4, and by reference number 415, in some aspects, a plurality of reduced capability PDCCH candidates may be included in a non-reduced-capability CORESET. For example, the plurality of reduced capability PDCCH candidates may be based at least in part on PDCCH candidates assigned to the plurality of reduced capability CORESETs and the non-reduced-capability CORESET, as described in connection with FIG. 5.

FIG. 5 shows a first example 510 in which a same PDCCH candidate to CCE hashing function is used for non-reduced-capability UEs and for reduced-capability UEs. In this case, the BS 110 may separate control information for reduced-capability UEs and non-reduced-capability UEs by transmitting the control information on a PDCCH candidate corresponding to a reduced capability CORESET or a non-reduced-capability CORESET, respectively. The first example 510 may be an example including 48 resource blocks (RBs), a 2-symbol slot, an aggregation level of 4, and 4 candidates. In that case, each PDCCH candidate may include 3 RBs and two symbols. As shown, PDCCH candidates 0 and 2 may be assigned to non-reduced-capability UEs and PDCCH candidates 1 and 3 may be assigned to reduced-capability UEs, though in practice, any assignment of PDCCH candidates to UE types may be used. The first example 510 may involve less specification impact than the second example 520.

In the second example 520, different PDCCH candidate to CCE hashing functions are used for the reduced capability CORESET(s) and the non-reduced capability CORESET. Thus, the reduced capability CORESET(s) are included in the bandwidth region shown by reference number 530. Thus, the bandwidth to be scanned by the reduced-capability UE is reduced, thereby conserving communication and computing resources of the reduced-capability UE and reducing blind decoding complexity. In this case, the BS 110 may separate control information for reduced-capability UEs and non-reduced-capability UEs by transmitting the control information on a PDCCH candidate corresponding to a reduced capability CORESET or a non-reduced-capability CORESET, respectively.

In some aspects, the BS 110 may explicitly signal information identifying a reduced capability CORESET for the UE 120. For example, the BS 110 may transmit information indicating a resource allocation or a set of CCEs for the reduced capability CORESET. In some aspects, as mentioned above, the BS 110 may use a mapping between a non-reduced-capability configuration of a CORESET (e.g., CORESET0 or another CORESET) and a reduced capability configuration. Thus, the BS 110 may indicate that the CORESET is a reduced capability CORESET. Explicitly signaling the information identifying the reduced capability CORESET or using the mapping may increase network flexibility in configuring the reduced capability CORESET.

As indicated above, FIGS. 4 and 5 are provided as one or more examples. Other examples may differ from what is described with respect to FIGS. 4 and 5.

Figure 6:
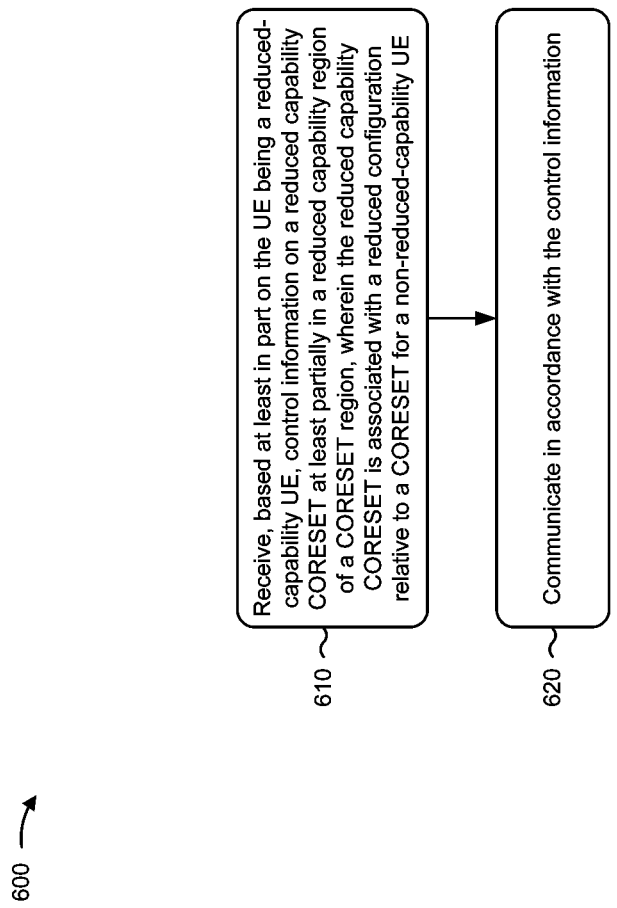
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, a reduced-capability UE, and/or the like) performs operations associated with a CORESET for a reduced capability user equipment.

As shown in FIG. 6, in some aspects, process 600 may include receiving, based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE (block 610). For example, the UE (e.g., using antenna 252, DEMOD 254, MIMO detector 256, receive processor 258, controller/processor 280, and/or the like) may receive, based at least in part on the UE being a reduced-capability UE, control information on a reduced capability CORESET at least partially in a reduced capability region of a CORESET region, as described above. In some aspects, the reduced capability CORESET is associated with a reduced configuration relative to a CORESET for a non-reduced-capability UE.

As further shown in FIG. 6, in some aspects, process 600 may include communicating in accordance with the control information (block 620). For example, the UE (e.g., using controller/processor 280, transmit processor 264, TX MIMO processor 266, MOD 254, antenna 252, and/or the like) may communicate in accordance with the control information, as described above.

Process 600 may include additional aspects, such as any single aspect or any combination of aspects described below and/or in connection with one or more other processes described elsewhere herein.

In a first aspect, the reduced capability region has a different frequency range than the CORESET region.

In a second aspect, alone or in combination with the first aspect, the reduced capability region has a different time range than the CORESET region.

In a third aspect, alone or in combination with one or more of the first and second aspects, the reduced capability region has a different number of control channel elements or control channel candidates than the CORESET region.

In a fourth aspect, alone or in combination with one or more of the first through third aspects, the reduced capability region is associated with a different aggregation level than the CORESET region.

In a fifth aspect, alone or in combination with one or more of the first through fourth aspects, the control information includes a grant scrambled using a radio network temporary identifier that indicates that the reduced capability CORESET is associated with the reduced configuration.

In a sixth aspect, alone or in combination with one or more of the first through fifth aspects, the reduced capability region is associated with a same bandwidth as the CORESET region.

In a seventh aspect, alone or in combination with one or more of the first through sixth aspects, the reduced capability CORESET and the CORESET for the non-reduced-capability UE are associated with a same PDCCH candidate to CCE hashing function.

In an eighth aspect, alone or in combination with one or more of the first through seventh aspects, the reduced capability CORESET is associated with a first set of control channel candidates of the CORESET region, and the CORESET for the non-reduced-capability UE is associated with a second set of control channel candidates of the CORESET region.

In a ninth aspect, alone or in combination with one or more of the first through eighth aspects, the reduced capability region has a narrower bandwidth than the CORESET region.

In a tenth aspect, alone or in combination with one or more of the first through ninth aspects, the reduced capability CORESET and the CORESET for the non-reduced-capability UE are associated with respective PDCCH candidate to CCE hashing functions, and process 600 further comprises determining that the control information is received on the reduced capability CORESET based at least in part on a PDCCH candidate to CCE hashing function associated with the reduced capability CORESET.

In an eleventh aspect, alone or in combination with one or more of the first through tenth aspects, process 600 includes receiving information indicating a first set of control channel candidates associated with the reduced capability CORESET and a second set of control channel candidates associated with the CORESET for the non-reduced-capability UE.

In a twelfth aspect, alone or in combination with one or more of the first through eleventh aspects, process 600 includes receiving information and using the information to map a non-reduced-capability configuration associated with the CORESET for the non-reduced-capability UE to a reduced capability configuration associated with the reduced capability CORESET.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
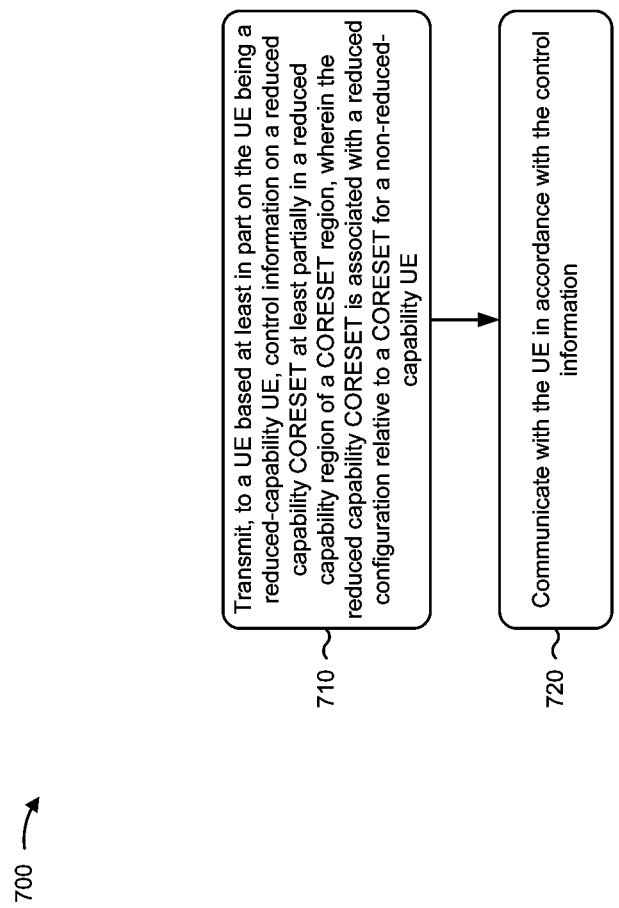
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with a CORESET for reduced-capability user equipment.

As shown in FIG. 7, in some aspects, process 700 may include transmitting, to a UE based at least in part on the UE being a reduced-capability UE, control information on a reduced capability CORESET at least partially in a reduced capability region of a CORESET region, wherein the reduced capability CORESET is associated with a reduced configuration relative to a CORESET for a non-reduced-capability UE (block 710). For example, the base station (e.g., using controller/processor 240, transmit processor 220, TX MIMO processor 230, MOD 232, antenna 234, and/or the like) may transmit, to a UE based at least in part on the UE being a reduced-capability UE, control information on a reduced capability CORESET at least partially in a reduced capability region of a CORESET region, as described above. In some aspects, the reduced capability CORESET is associated with a reduced configuration relative to a CORESET for a non-reduced-capability UE.

As further shown in FIG. 7, in some aspects, process 700 may include communicating with the UE in accordance with the control information (block 720). For example, the base station (e.g., using antenna 234, DEMOD 232, MIMO detector 236, receive processor 238, controller/processor 240, and/or the like) may communicate with the UE in accordance with the control information, as described above.

Process 700 may include additional aspects, such as any single aspect or any combination of aspects described below and/or in connection with one or more other processes described elsewhere herein.

In a first aspect, the reduced capability region has a different frequency range than the CORESET region.

In a second aspect, alone or in combination with the first aspect, the reduced capability region has a different time range than the CORESET region.

In a third aspect, alone or in combination with one or more of the first and second aspects, the reduced capability region has a different number of control channel elements or control channel candidates than the CORESET region.

In a fourth aspect, alone or in combination with one or more of the first through third aspects, the reduced capability region is associated with a different aggregation level than the CORESET region.

In a fifth aspect, alone or in combination with one or more of the first through fourth aspects, the control information includes a grant scrambled using a radio network temporary identifier that indicates that the reduced capability CORESET is associated with the reduced configuration.

In a sixth aspect, alone or in combination with one or more of the first through fifth aspects, the reduced capability region is associated with a same bandwidth as the CORESET region.

In a seventh aspect, alone or in combination with one or more of the first through sixth aspects, the reduced capability CORESET and the CORESET for the non-reduced-capability UE are associated with a same PDCCH candidate to CCE hashing function.

In an eighth aspect, alone or in combination with one or more of the first through seventh aspects, the reduced capability CORESET is associated with a first set of control channel candidates of the CORESET region, and the CORESET for the non-reduced-capability UE is associated with a second set of control channel candidates of the CORESET region.

In a ninth aspect, alone or in combination with one or more of the first through eighth aspects, the reduced capability region has a narrower bandwidth than the CORESET region.

In a tenth aspect, alone or in combination with one or more of the first through ninth aspects, the reduced capability CORESET and the CORESET for the non-reduced-capability UE are associated with respective PDCCH candidate to CCE hashing functions, and process 700 further comprises determining that the control information is received on the reduced capability CORESET based at least in part on a PDCCH candidate to CCE hashing function associated with the reduced capability CORESET.

In an eleventh aspect, alone or in combination with one or more of the first through tenth aspects, process 700 includes transmitting information indicating a first set of control channel candidates associated with the reduced capability CORESET and a second set of control channel candidates associated with the CORESET for the non-reduced-capability UE.

In a twelfth aspect, alone or in combination with one or more of the first through eleventh aspects, process 700 includes transmitting information used to map a non-reduced-capability configuration associated with the CORESET for the non-reduced-capability UE to a reduced capability configuration associated with the reduced capability CORESET.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a user equipment (UE), comprising: receiving, based at least in part on the UE being a reduced-capability UE, control information on a reduced capability control resource set (CORESET) at least partially in a reduced capability region of a CORESET region, wherein the reduced capability CORESET is associated with a reduced configuration relative to a CORESET for a non-reduced-capability UE; and communicating in accordance with the control information.

Aspect 2: The method of aspect 1, wherein the reduced capability region has a different frequency range than the CORESET region.

Aspect 3: The method of any of aspects 1-2, wherein the reduced capability region has a different time range than the CORESET region.

Aspect 4: The method of any of aspects 1-3, wherein the reduced capability region has a different number of control channel elements or control channel candidates than the CORESET region.

Aspect 5: The method of any of aspects 1-4, wherein the reduced capability region is associated with a different aggregation level than the CORESET region.

Aspect 6: The method of any of aspects 1-5, wherein the control information includes a grant scrambled using a radio network temporary identifier that indicates that the reduced capability CORESET is associated with the reduced configuration.

Aspect 7: The method of any of aspects 1 or 3-6, wherein the reduced capability region is associated with a same bandwidth as the CORESET region.

Aspect 8: The method of any of aspects 1-7, wherein the reduced capability CORESET and the CORESET for the non-reduced-capability UE are associated with a same physical downlink control channel (PDCCH) candidate to control channel element (CCE) hashing function.

Aspect 9: The method of aspect 8, wherein the reduced capability CORESET is associated with a first set of control channel candidates of the CORESET region and the CORE- SET for the non-reduced-capability UE is associated with a second set of control channel candidates of the CORESET region.

Aspect 10: The method of any of aspects 1-6, 8, or 9, wherein the reduced capability region has a narrower bandwidth than the CORESET region.

Aspect 11: The method of any of aspects 1-7 or 9-10, wherein the reduced capability CORESET and the CORESET for the non-reduced-capability UE are associated with respective physical downlink control channel (PDCCH) candidate to control channel element (CCE) hashing functions, and wherein the method further comprises determining that the control information is received on the reduced capability CORESET based at least in part on a PDCCH candidate to CCE hashing function associated with the reduced capability CORESET.

Aspect 12: The method of any of aspects 1-11, further comprising: receiving information indicating a first set of control channel candidates associated with the reduced capability CORESET and a second set of control channel candidates associated with the CORESET for the non-reduced-capability UE.

Aspect 13: The method of any of aspects 1-12, further comprising: receiving information and using the information to map a non-reduced-capability configuration associated with the CORESET for the non-reduced-capability UE to a reduced capability configuration associated with the reduced capability CORESET.

Aspect 14: A method of wireless communication performed by a base station, comprising: transmitting, to a user equipment (UE) based at least in part on the UE being a reduced-capability UE, control information on a reduced capability control resource set (CORESET) at least partially in a reduced capability region of a CORESET region, wherein the reduced capability CORESET is associated with a reduced configuration relative to a CORESET for a non-reduced-capability UE; and communicating with the UE in accordance with the control information.

Aspect 15: The method of aspect 14, wherein the reduced capability region has a different frequency range than the CORESET region.

Aspect 16: The method of any of aspects 14-15, wherein the reduced capability region has a different time range than the CORESET region.

Aspect 17: The method of any of aspects 14-16, wherein the reduced capability region has a different number of control channel elements or control channel candidates than the CORESET region.

Aspect 18: The method of any of aspects 14-17, wherein the reduced capability region is associated with a different aggregation level than the CORESET region.

Aspect 19: The method of any of aspects 14-18, wherein the control information includes a grant scrambled using a radio network temporary identifier that indicates that the reduced capability CORESET is associated with the reduced configuration.

Aspect 20: The method of any of aspects 14 or 16-19, wherein the reduced capability region is associated with a same bandwidth as the CORESET region.

Aspect 21: The method of any of aspects 14-20, wherein the reduced capability CORESET and the CORESET for the non-reduced-capability UE are associated with a same physical downlink control channel (PDCCH) candidate to control channel element (CCE) hashing function.

Aspect 22: The method of aspect 21, wherein the reduced capability CORESET is associated with a first set of control channel candidates of the CORESET region and the CORESET for the non-reduced-capability UE is associated with a second set of control channel candidates of the CORESET region.

Aspect 23: The method of any of aspects 14-19 or 21-22, wherein the reduced capability region has a narrower bandwidth than the CORESET region.

Aspect 24: The method of any of aspects 14-20 or 23, wherein the reduced capability CORESET and the CORESET for the non-reduced-capability UE are associated with respective physical downlink control channel (PDCCH) candidate to control channel element (CCE) hashing functions, and wherein the method further comprises determining that the control information is received on the reduced capability CORESET based at least in part on a PDCCH candidate to CCE hashing function associated with the reduced capability CORESET.

Aspect 25: The method of any of aspects 14-24, further comprising: transmitting information indicating a first set of control channel candidates associated with the reduced capability CORESET and a second set of control channel candidates associated with the CORESET for the non-reduced-capability UE.

Aspect 26: The method of any of aspects 14-25, further comprising: transmitting information used to map a non-reduced-capability configuration associated with the CORESET for the non-reduced-capability UE to a reduced capability configuration associated with the reduced capability CORESET.

Aspect 27: An apparatus for wireless communication at a device, comprising a processor; memory coupled with the processor; and instructions stored in the memory and executable by the processor to cause the apparatus to perform the method of one or more aspects of aspects 1-26.

Aspect 28: A device for wireless communication, comprising a memory and one or more processors coupled to the memory, the memory and the one or more processors configured to perform the method of one or more aspects of aspects 1-26.

Aspect 29: An apparatus for wireless communication, comprising at least one means for performing the method of one or more aspects of aspects 1-26.

Aspect 30: A non-transitory computer-readable medium storing code for wireless communication, the code comprising instructions executable by a processor to perform the method of one or more aspects of aspects 1-26.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, based at least in part on the UE being a reduced-capability UE, control information on a reduced capability control resource set (CORESET) at least partially in a reduced capability region of a CORESET region,
wherein the reduced capability CORESET is associated with a reduced configuration relative to a CORESET for a non-reduced-capability UE and is associated with a physical downlink control channel (PDCCH) candidate to control channel element (CCE) hashing function; and
communicating in accordance with the control information.

2. The method of claim 1, wherein the reduced capability region has a different frequency range than the CORESET region.

3. The method of claim 1, wherein the reduced capability region has a different time range than the CORESET region.

4. The method of claim 1, wherein the reduced capability region has a different number of control channel elements or control channel candidates than the CORESET region.

5. The method of claim 1, wherein the reduced capability region is associated with a different aggregation level than the CORESET region.

6. The method of claim 1, wherein the control information includes a grant scrambled using a radio network temporary identifier that indicates that the reduced capability CORESET is associated with the reduced configuration.

7. The method of claim 1, wherein the reduced capability region is associated with a same bandwidth as the CORESET region.

8. The method of claim 1, wherein the CORESET for the non-reduced-capability UE is associated with the PDCCH candidate to CCE hashing function.

9. The method of claim 8, wherein the reduced capability CORESET is associated with a first set of control channel candidates of the CORESET region and the CORESET for the non-reduced-capability UE is associated with a second set of control channel candidates of the CORESET region.

10. The method of claim 1, wherein the reduced capability region has a narrower bandwidth than the CORESET region.

11. The method of claim 1, wherein the reduced capability CORESET and the CORESET for the non-reduced-capability UE are associated with respective PDCCH candidate to CCE hashing functions, and wherein the method further comprises determining that the control information is received on the reduced capability CORESET based at least in part on the PDCCH candidate to CCE hashing function associated with the reduced capability CORESET.

12. The method of claim 1, further comprising:
receiving information indicating a first set of control channel candidates associated with the reduced capability CORESET and a second set of control channel candidates associated with the CORESET for the non-reduced-capability UE.

13. The method of claim 1, further comprising:
receiving information and using the information to map a non-reduced-capability configuration associated with the CORESET for the non-reduced-capability UE to a reduced capability configuration associated with the reduced capability CORESET.

14. A method of wireless communication performed by network entity, comprising:
transmitting, to a user equipment (UE) based at least in part on the UE being a reduced-capability UE, control information on a reduced capability control resource set (CORESET) at least partially in a reduced capability region of a CORESET region,
wherein the reduced capability CORESET is associated with a reduced configuration relative to a CORESET for a non-reduced-capability UE and is associated with a physical downlink control channel (PDCCH) candidate to control channel element (CCE) hashing function; and communicating with the UE in accordance with the control information.

15. The method of claim 14, wherein the reduced capability region has a different frequency range than the CORESET region.

16. The method of claim 14, wherein the reduced capability region has a different time range than the CORESET region.

17. The method of claim 14, wherein the reduced capability region has a different number of control channel elements or control channel candidates than the CORESET region.

18. The method of claim 14, wherein the reduced capability region is associated with a different aggregation level than the CORESET region.

19. The method of claim 14, wherein the control information includes a grant scrambled using a radio network temporary identifier that indicates that the reduced capability CORESET is associated with the reduced configuration.

20. The method of claim 14, wherein the reduced capability region is associated with a same bandwidth as the CORESET region.

21. The method of claim 14, wherein the CORESET for the non-reduced-capability UE is associated with the PDCCH candidate to CCE hashing function.

22. The method of claim 21, wherein the reduced capability CORESET is associated with a first set of control channel candidates of the CORESET region and the CORESET for the non-reduced-capability UE is associated with a second set of control channel candidates of the CORESET region.

23. The method of claim 14, wherein the reduced capability region has a narrower bandwidth than the CORESET region.

24. The method of claim 14, wherein the reduced capability CORESET and the CORESET for the non-reduced-capability UE are associated with respective PDCCH candidate to CCE hashing functions, and wherein the method further comprises determining that the control information is received on the reduced capability CORESET based at least in part on the PDCCH candidate to CCE hashing function associated with the reduced capability CORESET.

25. The method of claim 14, further comprising:
transmitting information indicating a first set of control channel candidates associated with the reduced capability CORESET and a second set of control channel candidates associated with the CORESET for the non-reduced-capability UE.

26. A user equipment (UE) for wireless communication, comprising:

a memory; and
one or more processors coupled to the memory, the one or more processors configured to:
receive, based at least in part on the UE being a reduced-capability UE, control information on a reduced capability control resource set (CORESET) at least partially in a reduced capability region of a CORESET region,
wherein the reduced capability CORESET is associated with a reduced configuration relative to a CORESET for a non-reduced-capability UE and is associated with a physical downlink control channel (PDCCH) candidate to control channel element (CCE) hashing function; and
communicate in accordance with the control information.

27. The UE of claim 26, wherein the control information includes a grant scrambled using a radio network temporary identifier that indicates that the reduced capability CORESET is associated with the reduced configuration.

28. The UE of claim 26, wherein the CORESET for the non-reduced-capability UE is associated with the PDCCH candidate to CCE hashing function.

29. A network entity for wireless communication, comprising:
a memory; and
one or more processors coupled to the memory, the one or more processors configured to:
transmit, to a user equipment (UE) based at least in part on the UE being a reduced-capability UE, control information on a reduced capability control resource set (CORESET) at least partially in a reduced capability region of a CORESET region,
wherein the reduced capability CORESET is associated with a reduced configuration relative to a CORESET for a non-reduced-capability UE and is associated with a physical downlink control channel (PDCCH) candidate to control channel element (CCE) hashing function; and
communicate with the UE in accordance with the control information.

30. The network entity of claim 29, wherein the reduced capability CORESET is associated with a first set of control channel candidates of the CORESET region and the CORESET for the non-reduced-capability UE is associated with a second set of control channel candidates of the CORESET region.

* * * * *